United States Patent [19]

Nasu

[11] Patent Number: 5,894,513
[45] Date of Patent: Apr. 13, 1999

[54] HANDS-FREE COMMUNICATION UNIT HAVING RESIDUAL ACOUSTIC ECHO SUPPRESSION MEANS FOR SUPPRESSING RESIDUAL ECHOES WHICH HAVE BEEN LEFT UNREMOVED BY AN ECHO CANCELLER, A BILATERAL COMMUNICATION SYSTEM AND A METHOD FOR SUPPRESSING RESIDUAL ECHOES

[75] Inventor: Noriyoshi Nasu, Saitama, Japan

[73] Assignee: NEC Corporation, Tokyo, Japan

[21] Appl. No.: 08/634,793

[22] Filed: Apr. 19, 1996

[30] Foreign Application Priority Data

Apr. 19, 1995 [JP] Japan ................. 7-093439

[51] Int. Cl.$^6$ ................. H04M 1/00
[52] U.S. Cl. ................. 379/390; 379/389; 379/390; 379/406; 379/410; 381/57; 381/94
[58] Field of Search ................. 379/388, 389, 379/390, 406, 409, 410, 345, 24, 5, 3; 381/57, 94

[56] References Cited

U.S. PATENT DOCUMENTS

| | | | |
|---|---|---|---|
| 3,754,105 | 8/1973 | Poschenrieder et al. | 379/410 |
| 4,543,665 | 9/1985 | Sotelo et al. | 379/388 |
| 4,894,820 | 1/1990 | Miyamoto et al. | 379/406 |
| 4,912,758 | 3/1990 | Arbel | 379/388 |
| 4,959,857 | 9/1990 | Erving et al. | 379/388 |
| 5,099,472 | 3/1992 | Townsend et al. | 379/388 |
| 5,131,032 | 7/1992 | Esaki et al. | 379/388 |

FOREIGN PATENT DOCUMENTS 5-14476  1/1993  Japan .

Primary Examiner—Dwayne Bost
Assistant Examiner—Keith Ferguson
Attorney, Agent, or Firm—Sughrue, Mion, Zinn, Macpeak & Seas, PLLC

[57] ABSTRACT

An acoustic echo suppression circuit is provided in a hands-free communication unit. The suppression circuit includes a variable loss circuit which is responsive to noise detection circuits. If the acoustic echo canceler fails to remove all environmental noise, the detection circuits enable the variable loss circuit to suppress the residual noise.

9 Claims, 2 Drawing Sheets

HANDS-FREE COMMUNICATION UNIT HAVING RESIDUAL ACOUSTIC ECHO SUPPRESSION MEANS FOR SUPPRESSING RESIDUAL ECHOES WHICH HAVE BEEN LEFT UNREMOVED BY AN ECHO CANCELLER, A BILATERAL COMMUNICATION SYSTEM AND A METHOD FOR SUPPRESSING RESIDUAL ECHOES

BACKGROUND OF THE INVENTION

This invention relates to an acoustic echo suppression circuit and, more particularly, to an art of acoustic echo suppression for cancelling residual echo signals which have been left unremoved by an echo canceller.

A conventional hands-free communication unit using a microphone and a loud speaker has been applied to a wide variety of fields such as a speaker phone system, a teleconferencing system, a phone conference system, cellular phone system used in an automobile or the like.

The hands-free communication unit allows two parties to communicate with each other bilaterally by collecting a talker's voice signal through a microphone and amplifying the received voice signal through a loud speaker. The received voice signal amplified through the loud speaker is likely to be collected by the microphone, causing the howling effect. Additionally an acoustic echo is caused by reflection of the talker's or receiver's voice or transmission delay under a certain communication environment. Therefore this hands-free communication unit requires to eliminate such howling effect as well as removing the acoustic echo.

The Japanese Patent Publication Laid-Open No. 14476 (1993) titled "Speaker Phone Unit" discloses a hands-free communication unit using an echo canceller for removing the acoustic echo and howling effect. The above speaker phone unit comprises an acoustic echo/howling canceller for removing an acoustic echo and howling effect, respectively and a channel echo/howling canceller constructed in the same way as in the acoustic echo/howling canceller. The acoustic echo/howling canceller removes acoustic echoes of the voice signals collected by a microphone. The channel echo/howling canceller removes channel echo and howling caused by wraparound of a hybrid circuit. As a result, this system keeps its communication quality from deterioration caused by a channel echo resulted from the received voice signal returning to a hybrid circuit and a peripheral noise such as the noise accompanied with running of the automobile, external noise or background noise.

The above speaker phone unit assumes transfer characteristics of the acoustic echo based on the received voice signal through the acoustic echo canceller and cancels the acoustic echo of the sounds collected by the microphone. For example, in the cellular phone system in an automobile, when the peripheral noise such as a wind blast accompanied with running of the automobile becomes louder, the microphone collects such peripheral noise as well as the acoustic echo therein, which is input to the acoustic echo canceller. The acoustic canceller fails to cancel the signal having transfer characteristics other than those assumed, thus leaving the residual echo unremoved and deteriorating communication quality.

SUMMARY OF THE INVENTION

It is an object of the present invention to provide an art for cancelling the residual acoustic echo left unremoved by the echo canceller owing to the peripheral noise and improving the communication quality.

It is another object of the present invention to provide a hands-free communication system by cancelling the residual acoustic echo left unremoved by the echo canceller owing to the peripheral noise and improving the communication quality.

The objects of the present invention are achieved by a hands-free communication unit having an acoustic echo canceller for cancelling an acoustic echo caused by a received voice signal amplified through a loud speaker returning to a microphone, the hands-free communication unit comprising: means for suppressing a transmitted residual acoustic echo signal left unremoved by the acoustic echo canceller owing to a peripheral noise by means of inserting an loss corresponding to the peripheral noise into a transmission path side.

Further more, the objects of the present invention are achieved by a method for suppressing a transmitted residual acoustic echo signal left unremoved by the acoustic echo canceller owing to a peripheral noise where an acoustic echo canceller cancels an acoustic echo caused by a received voice signal amplified through a loud speaker returning to a microphone, the method comprises a step of suppressing the residual acoustic echo signal by means of inserting loss corresponding to a peripheral noise into a transmission side of which the residual acoustic echo is transmitted.

The acoustic echo suppression art of the present invention cancels the residual echo signals left unremoved by the acoustic echo canceller owing to the peripheral noise by selecting a loss insert amount responding to the peripheral noise size, which realizes the hands-free communication exhibiting no echo effect and excellent communication quality.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

The present invention is described referring to a drawing.

Figure 1:
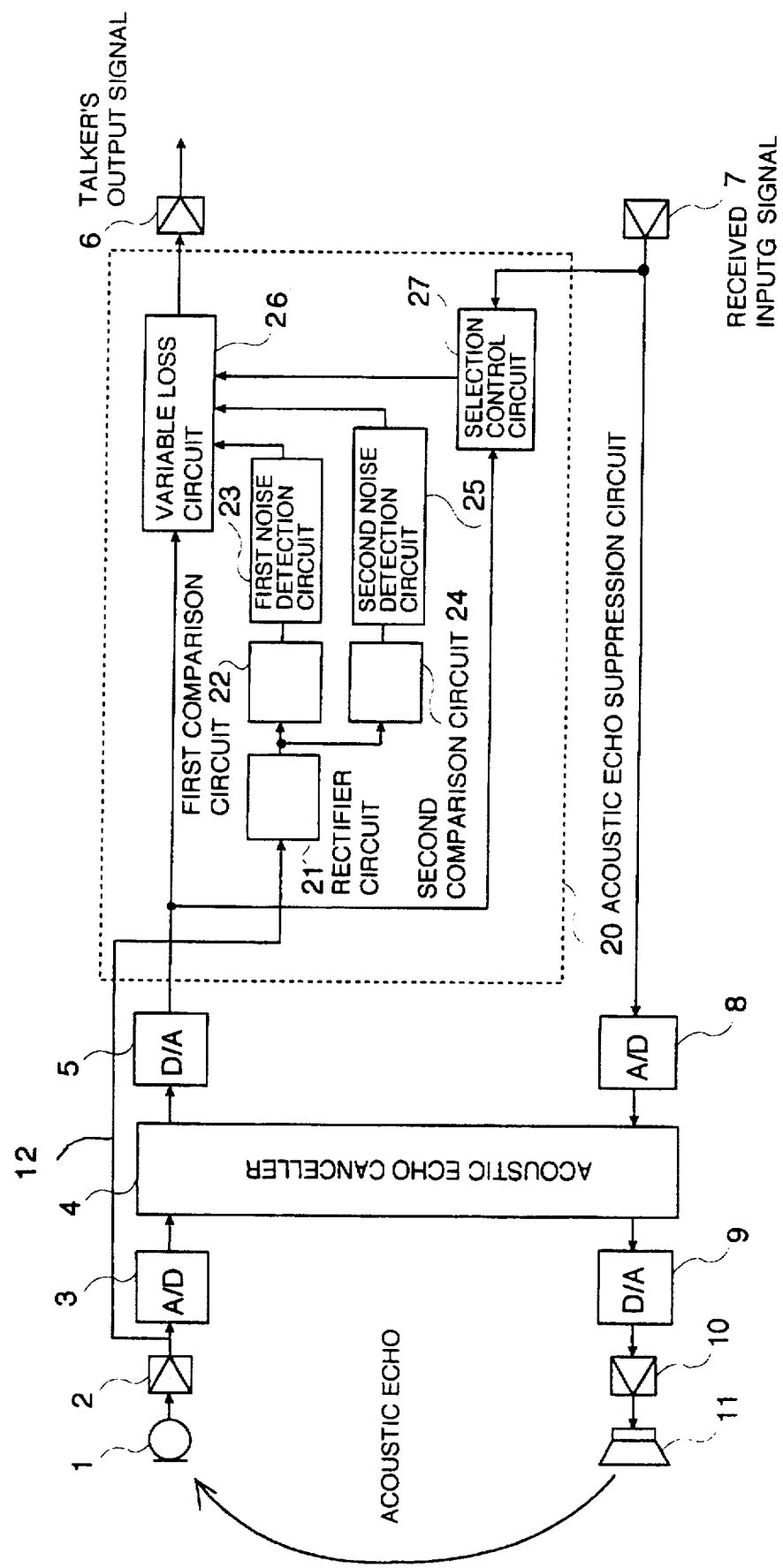
FIG. 1 is a block diagram of a hands-free communication unit using acoustic echo suppression means of the present invention.

FIG. 1 is a block diagram showing an embodiment of a hands-free communication unit using an acoustic echo suppression circuit of the present invention. It is assumed that the above unit is applied to a cellular phone unit used in an automobile.

The hands-free communication unit comprises a microphone 1 for collecting a talker's voice signal, an amplifier 2 for amplifying the talker's voice signal collected and converted to an electric signal by the microphone 1 to a predetermined level, an A/D converter 3 for converting the amplified talker's voice signal to a digital signal, an acoustic echo canceller 4 for removing the acoustic echo returning to the microphone 1, and a D/A converter 5 for converting the digital talker's voice signal to an analogue signal.

Furthermore, the hands-free communication unit comprises an acoustic echo suppression circuit 20 for suppressing the residual acoustic echo left unremoved by the acoustic echo canceller 4 by detecting the peripheral noise such as running noise or background noise inside the automobile from the talker's voice signal amplified through the amplifier 2, an amplifier 6 for sending the talker's voice signal with the residual acoustic echo removed to a transmission path, an amplifier 7 for amplifying a received voice signal to a predetermined level, an A/D converter 8 for converting the amplified received voice signal into a digital signal, a D/A converter 9 for converting the digital received voice signal received through the acoustic canceller 4 into an analogue signal and an amplifier 10 for actuating a loud speaker 11 by amplifying the analogue converted received voice signal to a predetermined loud speaker level.

Next the acoustic echo suppression circuit 20 is described in detail.

The numeral 21 is a rectifier circuit 21 which converts a talker's voice signal containing a peripheral noise and acoustic echo output from the amplifier 2 into a dc voltage.

The numeral 22 is a first comparator circuit which outputs a logic signal "1" if the value of dc voltage output from the rectifier circuit 21 is larger than a predetermined first threshold value and outputs a logic signal "0" if the value of dc voltage is smaller than the first threshold value.

The numeral 24 is a second comparator circuit which outputs a logic signal "1" if the value of dc voltage output from the rectifier circuit 21 is larger than a predetermined second threshold value which is larger than the first threshold value and outputs a logic signal "0" if the dc voltage value is smaller than the second threshold value.

The numeral 23 is a first noise detection circuit which outputs a first control signal instructing to insert a predetermined first loss insert amount into a variable loss circuit 26 if the dc output voltage in the first comparator circuit 22 continues for a predetermined time length or longer and is determined to be the peripheral noise.

The numeral 25 is a second noise detection circuit which outputs a second control signal instructing to insert a predetermined second loss insert amount which is larger than the first loss insert amount into the variable loss circuit 26 if the dc output voltage in the second comparator circuit 24 continues for a predetermined time length or longer (the same periods as in case of the noise detection circuit 23) and is determined to be the peripheral noise.

The numeral 27 is a selection control circuit which inhibits to insert the first or the second loss insert amount to the variable loss circuit 26 if the talker's voice signal collected by the microphone 1 is higher than the received voice signal and allows to insert the first or the second loss insert amount to the variable loss circuit 26 if the received voice signal is higher than the talker's voice signal.

The numeral 26 is a variable loss circuit which suppresses transmission of the residual acoustic echo signal left unremoved by the acoustic echo canceller 4 by inserting the first or the second loss insert amount in response to the first or the second control signal in the reception mode.

Here, the first noise detection circuit 23, the second noise detection circuit 25 and the variable loss circuit 26 are further described in detail.

Figure 2:
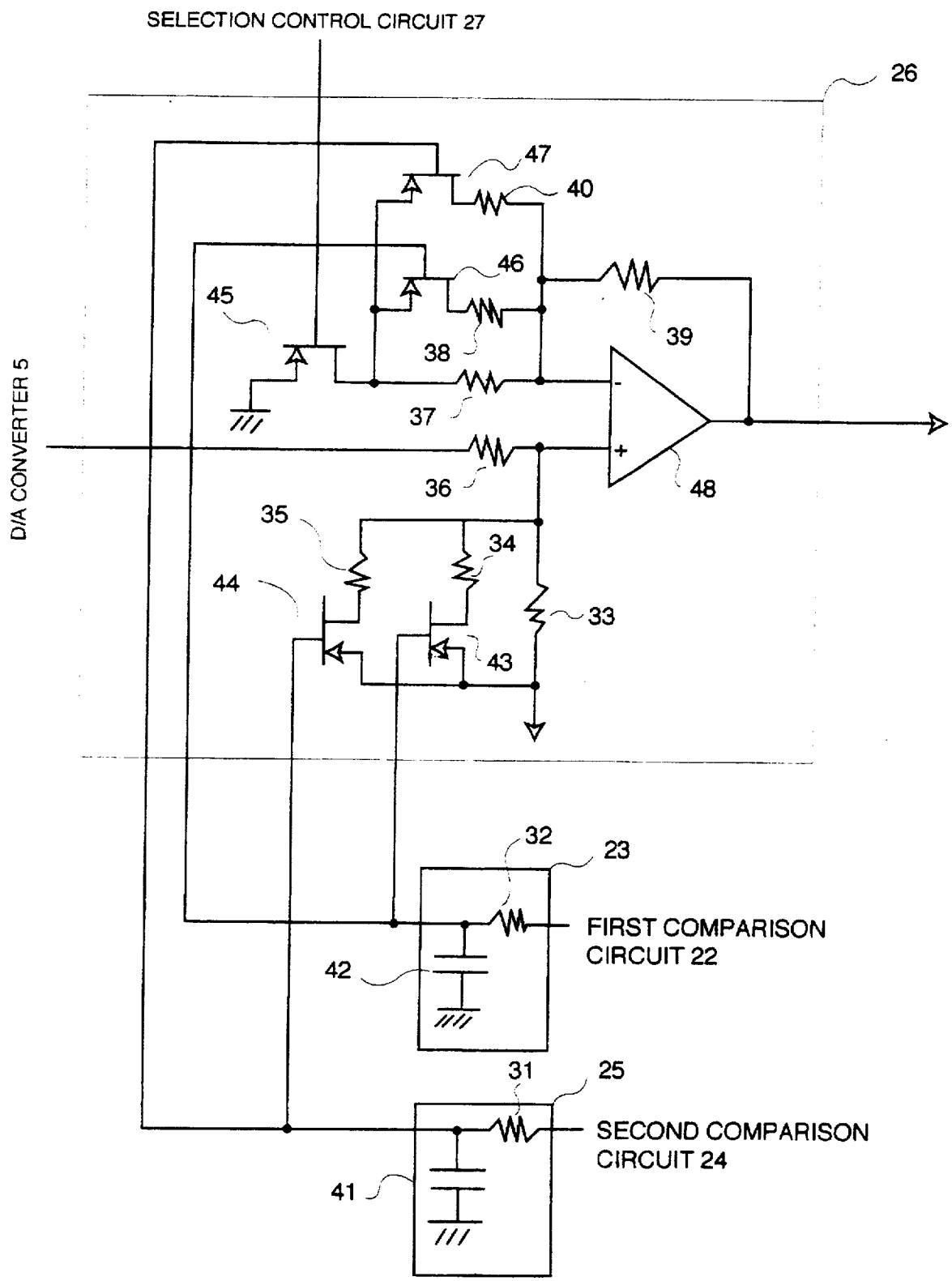
FIG. 2 is a circuitry diagram of a first noise detection circuit 23, a second noise detection circuit 25 and a variable loss circuit 26.

FIG. 2 is a circuitry diagram of the first noise detection circuit 23, the second noise detection circuit 25 and the variable loss circuit 26.

In this figure, the numerals 31 to 40 are resistors, the numerals 41 and 42 are capacitors, the numerals 43 to 47 are transistors and the numeral 48 is an operation amplifier.

The first noise detection circuit 23 comprises the resistor 32 and the capacitor 42. Determining that it is a noise, the first noise detection circuit 23 turns the transistors 43 and 46 of the variable loss circuit 26 ON if continued to be input the logic signal "1" for a preset time constant in the capacitor 42 from the first comparator circuit 22.

The second noise detection circuit 25 comprises the resistor 31 and the capacitor 41. Determining that it is a noise, the second noise detection circuit 25 turns the transistors 44 and 47 of the variable loss circuit 26 ON if continued to be input the logic signal "1" for a preset time constant in the capacitor 41 from the second comparator circuit 24.

The variable loss circuit 26 comprises the resistors 33 to 40, transistors 43 to 47 and an operation amplifier 48. Determining that it is in transmission mode, the selection control circuit 27 turns the transistor 45 ON. As a result the gain of the variable loss circuit 26 is constant in the transmission mode notwithstanding noise detection results of the noise detection circuits 23 and 25. On the other hand, Determining that it is in reception mode, the selection control circuit 27 turns the transistor 45 OFF and inserts loss. The amount of loss at this time is determined based on the gain in the plus side of the operation amplifier. This gain in the plus side is varied through turning the transistor 43 ON when the first noise detection circuit 23 detects noises, and through turning the transistor 44 ON when the second noise detection circuit 25 detects noises.

Next, an operation of the hands-free communication unit is described referring to FIG. 1. A talker's voice signal is collected by the microphone 1 and converted into an electric signal. The electrically converted talker's voice signal is amplified to a predetermined level through the amplifier 2 and then converted into a digital signal by the A/D converter 3. The digitally converted talker's voice signal passes through the acoustic echo canceller 4 and converted into an analogue signal through the D/A converter 5. The analogue converted talker's voice signal is compared with the received voice signal which has been amplified by the amplifier 7 to a predetermined level in the selection control circuit 27.

The selection control circuit 27 compares the talker's voice signal and the received voice signal by way of a predetermined manner. If the talker's voice signal is louder than the received voice signal, it is determined as a transmission mode. Then the selection control circuit 27 inhibits to insert the first or the second loss insert amount to the variable loss circuit 26. If the received voice signal is larger than the talker's voice signal, it is determined as a reception mode. The selection control circuit 27 allows the variable loss circuit 26 to insert the first or the second loss insert amount.

In case of the transmission mode, the talker's voice signal passes through the variable loss circuit 26 in which the loss insert amount is not inserted and is amplified to a predetermined level through the amplifier 6 for outputting. In case of the reception mode in the absence of the noise, the acoustic echo signal can be sufficiently removed by the acoustic echo canceller 4, which is not sent to the variable loss circuit 26.

In case of the reception mode in the presence of the peripheral noise, the acoustic echo canceller 4 fails to remove all acoustic echo signals. The residual echo signal left unremoved is input to the variable loss circuit 26. Inserting the first or the second loss insert amount in response to the first or the second control signal output from the noise detection circuits 23 and 25, respectively serves to keep the residual echo signal from being output.

While the received voice signal is amplified to a predetermined level through the amplifier 7 and then converted into a digital signal through the A/D converter 8. The digitally converted received voice signal passes through the acoustic echo canceller 4 and is converted into an analogue signal through the D/A converter 9. The resultant analogue signal is adjusted to a predetermined level by the amplifier 10 and output from the loud speaker 11.

The received voice signal amplified through the loud speaker 11 returns to the microphone 1 via the acoustic pass, which is collected together with the peripheral noise. The received voice is then input to the acoustic echo canceller 4 via the amplifier 2 and the A/D converter 3. The acoustic echo canceller 4 cancels the acoustic echo by assuming transfer characteristics of the acoustic echo pass returning to the microphone 1 from the loud speaker 11 based on the reference signal output from the A/D converter 8 on the reception pass. In case the peripheral noise becomes louder, an error occurs between the signal collected by the microphone 1 and input via the amplifier 2 and the A/D converter 3 and the assumed transfer characteristic of the acoustic echo pass. Some part of the acoustic echo is left unremoved by the acoustic canceller 4, resulting in the residual acoustic echo signal output from the D/A converter 5.

Next the residual echo suppression circuit is described.

The rectifier circuit 21 converts the talker's voice signal containing the peripheral noise which has been output from the amplifier 2 in the reception mode into the dc voltage, which is sent to the first and the second comparator circuits 23 and 25, respectively. The first comparator circuit 23 compares the dc output voltage of the rectifier circuit 21 with a predetermined first threshold value. If the input value of the dc voltage is determined to be larger than the first threshold value, the logic signal "1" is output to the noise detection circuit 23. IL the input value of the dc voltage is determined to be smaller than the first threshold value, the logic signal "0" is output to the noise detection circuit 23.

If the logic signal "1" sent from the first comparator circuit 22 continues for a predetermined time length or longer, the first noise detection circuit 23 judges the signal as the peripheral noise and outputs a first control signal instructing to insert the first loss insert amount to the variable loss circuit 26.

The second comparator circuit 24 likewise compares the dc output voltage of the rectifier circuit 21 with a predetermined second threshold value which is larger than the first threshold value. If the value of the dc output voltage is larger than the second threshold value, the second comparator circuit 24 outputs the logic signal "1". If the value of the dc output voltage is smaller than the second threshold value, the second comparator circuit 24 outputs the logic signal "0" to the second noise detection circuit 25. If the logic signal "1" sent from the second comparator circuit 24 continues for a predetermined time length or longer, the second noise detection circuit 25 judges the signal as the peripheral noise and outputs a second control signal instructing to insert the second loss insert amount which is larger than the first inset loss amount to the variable loss circuit 26. The first noise detection circuit 23 has the same construction as that of the second noise detection circuit 25 as well as the same period for detecting the peripheral noise.

If the quantitative level such as the peripheral noise continues for a predetermined time length or longer, the first and the second noise detection circuits 23 and 25 determine the signal as the peripheral noise, then sends the first and the second control signal to the variable loss circuit 26. The variable loss circuit 26 selects the insert amount of the insert loss based on the peripheral noise size and suppresses the residual acoustic echo signal output from the D/A converter.

Since the insert loss is inserted only in the reception mode, inputting the first and the second control signals in the transmission mode will not force the variable loss circuit 26 into operation. For example, if the first control signal is input in the reception mode, the first insert loss amount is inserted to damp the residual echo signal output from the acoustic echo canceller 4.

When the peripheral noise becomes further louder and the second control signal is input from the noise detection circuit 25, the second loss insert amount larger than the first loss insert amount is inserted so as to damp the acoustic echo signal output from the acoustic echo canceller 4.

In this embodiment, either the first or the second loss insert amount is selected based on the first or the second control signal. However the first control signal can be sent simultaneously with transmission of the second control signal so as to set the second loss insert amount by adding the difference between the second loss insert amount and the first loss insert amount.

The peripheral noise is detected by 2 channels of the comparator circuits and the noise detection circuit 5. However the number of the channel is not limited. Increasing the number of channels may allow more accurate detection of the peripheral noise level, allowing the variable loss circuit 26 to have a plurality of steps for inserting the loss insert amount. As a result, accuracy for removing the residual acoustic echo signal is improved, thus providing excellent communication quality.

What is claimed is:

1. A hands-free communication unit having an acoustic echo canceller for cancelling an acoustic echo caused by a received voice signal amplified through a loud speaker returning to a microphone, said hands-free communication unit comprising:

a rectifier circuit for converting a talker's voice signal collected through said microphone and converted to an electric signal into a d.c. voltage;

a first comparator circuit for comparing a value of d.c. voltage output from said rectifier circuit with a predetermined first threshold value, outputting a logic signal "1" when said value of d.c. voltage output from said rectifier circuit is larger than said predetermined first threshold value and outputting a logic signal "0" when said value of dc voltage is smaller than said first threshold value;

a second comparator circuit for comparing said value of d.c. voltage output from said rectifier circuit with a predetermined second threshold value larger than said first threshold value, outputting a logic signal "1" when said value of dc voltage output from said rectifier circuit is larger than said second threshold value and outputting a logic signal "0" when said value of dc voltage is smaller than said second threshold value;

a first noise detection circuit for outputting a first control signal instructing to insert a first loss insert amount when said logic signal "1" output from said first comparator circuit is repeated for a predetermined time length or longer to be determined as a peripheral noise;

a second noise detection circuit for outputting a second control signal instructing to insert a second loss insert amount larger than said first loss insert amount when said logic signal "1" output from said second comparator circuit is repeated for said predetermined time length or longer to be determined as a peripheral noise;

a selection control circuit for comparing said talker's voice signal with said received voice signal to determine a condition as a transmission mode when said talker's voice signal is louder than said received signal and as a reception mode when said received signal is louder than said talker's voice signal, and outputting an insert control signal for forbidding to insert said loss in case of said transmission mode and allowing to insert said loss in case of said reception mode; and said variable loss circuit provided on a transmission path side in a rear stage of said echo canceller, for inserting said predetermined first loss insert amount when said insert control signal indicates reception mode and said first control signal has been input, and inserting said predetermined second loss insert amount when said insert control signal indicates reception mode and said second control signal has been input.

2. The hands-free communication unit of claim 1, wherein said variable loss circuit comprises means for giving a minus gain corresponding to said first loss insert amount to said residual acoustic echo signal when said insert control signal indicates reception mode and said first control signal has been input, and giving a minus gain corresponding to said second loss insert amount to said residual acoustic echo signal when said insert control signal indicates reception mode and said second control signal has been input.

3. A bilateral communication system in which an acoustic echo caused by a received voice signal amplified through a loud speaker returning to a microphone is removed by an acoustic echo canceler where talker's voice is collected by a microphone and a received voice is amplified by a loud speaker, said bilateral communication system comprising:

means for suppressing a residual acoustic echo signal left unremoved by said acoustic echo canceler owing to a peripheral noise by inserting a loss corresponding to said peripheral noise into a transmission path side connected to said loud speaker, wherein said means for suppressing comprises:

a rectifier circuit for converting a talker's voice signal collected through said microphone and converted to an electric signal into a d.c. voltage;

a first comparator circuit for comparing a value of d.c. voltage output from said rectifier circuit with a predetermined first threshold value, outputting a logic signal "1" when said value of d.c. voltage output from said rectifier circuit is larger than said predetermined first threshold value and outputting a logic signal "0" when said value of dc voltage is smaller than said first threshold value;

a second comparator circuit for comparing said value of d.c. voltage output from said rectifier circuit with a predetermined second threshold value larger than said first threshold value, outputting a logic signal "1" when said value of dc voltage output from said rectifier circuit is larger than said second threshold value and outputting a logic signal "0" when said value of dc voltage is smaller than said second threshold value;

a first noise detection circuit for outputting a first control signal instructing to insert a first loss insert amount when said logic signal "1" output from said first comparator circuit is repeated for a predetermined time length;

a second noise detection circuit for outputting a second control signal instructing to insert a second loss insert amount larger than said first loss insert amount when said logic signal "1" output from said second comparator circuit is repeated for said predetermined time length;

a selection control circuit for comparing said talker's voice signal with said received voice signal to determine a condition as a transmission mode when said talker's voice signal is louder than said received signal, and as a reception mode when said received signal is louder than said talker's voice signal, and outputting an insert control signal for forbidding to insert said loss in case of said transmission mode and allowing to insert said loss in case of said reception mode; and said variable loss circuit provided on a transmission path side in a rear stage of said echo canceller, for inserting said predetermined first loss insert amount when said insert control signal indicates reception mode and said first control signal has been input, and inserting said predetermined second loss insert amount when said insert control signal indicates reception mode and said second control signal has been input.

4. The bilateral communication system of claim 3, wherein said variable loss circuit comprises means for giving a minus gain corresponding to said first loss insert amount to said residual acoustic echo signal when said insert control signal indicates reception mode and said first control signal has been input, and giving a minus gain corresponding to said second loss insert amount to said residual acoustic echo signal when said insert control signal indicates reception mode and said second control signal has been input.

5. A hands-free communication unit having a microphone and a speaker, comprising:

an acoustic echo canceller connected to said microphone and said speaker;

a first comparator circuit receiving a signal from said microphone and comparing the level of said signal with a first threshold value and generating a first comparison signal;

a second comparator circuit receiving the signal from said microphone and comparing the level of said signal with a second threshold value and generating a second comparison signal;

a first noise detection circuit responsive to said first comparison signal for outputting a first control signal;

a second noise detection circuit responsive to said second comparison signal for outputting a second control signal;

a variable loss circuit provided on a transmission path side of said communication unit, said variable loss circuit responsive to said first control signal to insert into the transmission path a first loss insert amount, and responsive to said second control signal to insert into the transmission path a second loss insert amount.

6. The hands-free communication unit of claim 5, further comprising a rectifier connected between said microphone and said first and second comparison circuits, and wherein said first and second comparison circuits compare the signal from said microphone after the signal had been rectified by said rectifier.

7. The hands-free communication unit of claim 5, further comprising a selection control circuit connected to the transmission path and to a reception path and sending an inhibit signal to said variable loss circuit when the level of signals on the transmit path is higher than the level of signals on the receive path.

8. The hands-free communication unit of claim 5, further comprising a bypass path bypassing said acoustic echo canceler, wherein said first and second comparison circuits receive the signal from the microphone via said bypass path.

9. The hands-free communication unit of claim 6, further comprising a bypass path bypassing said acoustic echo canceler, wherein said rectifier receives the signal from the microphone via said bypass path.

* * * * *

UNITED STATES PATENT AND TRADEMARK OFFICE
CERTIFICATE OF CORRECTION

PATENT NO. : 5,894,513
DATED : April 13, 1999
INVENTOR(S) : Noriyoshi NASU

It is certified that error appears in the above-indentified patent and that said Letters Patent is hereby corrected as shown below:

Column 4, line 48, delete "larger" and insert --louder--

Column 5, line 31, delete "23 and 25" and insert --22 and 24--

Column 5, line 31, delete "circuit 23" and insert --circuit 22--

Column 5, line 36, delete "IL" and insert --If--

Signed and Sealed this

Thirtieth Day of November, 1999

Attest:

Q. TODD DICKINSON

Attesting Officer

Acting Commissioner of Patents and Trademarks